US005742756A

United States Patent [19]

Dillaway et al.

[11] Patent Number: 5,742,756
[45] Date of Patent: Apr. 21, 1998

[54] SYSTEM AND METHOD OF USING SMART CARDS TO PERFORM SECURITY-CRITICAL OPERATIONS REQUIRING USER AUTHORIZATION

[75] Inventors: Blair B. Dillaway; Douglas C. Barlow, both of Redmond; Terry M. Lipscomb, Bellevue, all of Wash.

[73] Assignee: Microsoft Corporation, Redmond, Wash.

[21] Appl. No.: 600,305

[22] Filed: Feb. 12, 1996

[51] Int. Cl.$^6$ .................. H04K 1/00; H04L 9/00
[52] U.S. Cl. .................. 395/186; 380/32; 380/46; 380/25
[58] Field of Search .................. 395/186, 187.01, 395/188.01; 380/4, 23, 25, 30, 21, 49, 24, 29, 46, 50; 235/380, 375, 379

[56] References Cited

U.S. PATENT DOCUMENTS

| | | | |
|---|---|---|---|
| 4,758,714 | 7/1988 | Carlson et al. | 235/380 |
| 5,012,074 | 4/1991 | Masada | 235/379 |
| 5,048,085 | 9/1991 | Abraham et al. | 380/23 |
| 5,065,429 | 11/1991 | Lang | 380/25 |
| 5,111,030 | 5/1992 | Brasington et al. | 235/375 |
| 5,146,499 | 9/1992 | Geffrotin | 380/23 |
| 5,148,481 | 9/1992 | Abraham et al. | 380/46 |
| 5,233,547 | 8/1993 | Kapp et al. | 364/705.02 |
| 5,311,450 | 5/1994 | Ojima | 364/550 |
| 5,406,624 | 4/1995 | Tulpan | 380/4 |
| 5,515,440 | 5/1996 | Mooney et al. | 380/25 |
| 5,590,199 | 12/1996 | Krajewski, Jr. et al. | 380/25 |
| 5,594,227 | 1/1997 | Deo | 235/380 |

OTHER PUBLICATIONS

Visa International, "Integrated Circuit Card Terminal Specification for Payment Systems" (Jun. 30,1995).

*Primary Examiner*—Robert W. Beausoliel, Jr.
*Assistant Examiner*—Ly V. Hua
*Attorney, Agent, or Firm*—Lee & Hayes, PLLC

[57] ABSTRACT

The specification describes a user security system for use in conjunction with an operator terminal such as a personal computer. The user security system utilizes an intelligent security token, commonly referred to as a Smart Card, for security-critical operations. A peripheral reader device provides communications between the Smart Card and the operator terminal. The Smart Card is programmed to signal the reader device prior to performing a security-critical operation and to wait for a counter-signal before performing any such security-critical operation. The reader device has a security key that is physically operable by a person. The reader device is configured to supply the counter-signal to the Smart Card only in response to operation of the security key, and to prevent the operator terminal from supplying the counter-signal.

45 Claims, 2 Drawing Sheets

SYSTEM AND METHOD OF USING SMART CARDS TO PERFORM SECURITY-CRITICAL OPERATIONS REQUIRING USER AUTHORIZATION

TECHNICAL FIELD

This invention relates to intelligent security tokens designed to work with a programmable terminal or personal computer. The most common implementations of such security tokens are commonly referred to as Smart Cards.

BACKGROUND OF THE INVENTION

Technological advances over the past decade have made possible low cost microprocessor-based devices, such as Smart Cards. These devices are generally characterized by small size—roughly that of a credit card in the case of Smart Cards—and by the fact that they incorporate active intelligence such as programmable microprocessors. Smart Card-like devices generally lack self-contained displays or user input capabilities, but can augment personal computers to allow them to perform various operations relating to user identification or authentication with high assurance. A Smart Card is by far the most common implementation of such a device, though by no means the only one. Any rigid plastic shell which can hold a microprocessor chip and associated electrical pads for external connectivity is feasible.

Certain of these devices are being developed especially for use as intelligent security tokens in environments where cryptographic techniques are used to perform security critical tasks requiring user authorization, such as bulk encryption, identification, authentication, digital signature generation.

Cryptography is the art and science of keeping messages secure from eavesdroppers and adversaries. Historically, valuable messages were kept secure by personal envoys who hand-carried sensitive information from sending parties to receiving parties. While useful in its time, this protection method is not very practical in a modern world where information moves easily and changes rapidly.

In more recent history, with the advent of computers, wireless communications, and other technological advances, information can be exchanged very quickly among many different individuals who are often spread all over the world. To provide a secure interchange of information in the electronic arena, one traditional approach was to institute proprietary computerized systems that were closed to the general public. Such proprietary systems promoted security simply by restricting physical access. A private communication network linked only authorized terminals, and only participants with the appropriate security clearance were permitted access to the terminals. Hence, participants and information were authenticated by definition, and the integrity and value of information were preserved within the confines of the closed processing system. Unfortunately, proprietary systems are not useful in a grander context that envisions the interchange of information among virtually any individuals without limitation.

Cryptography has evolved in the electronic setting as a means to securely transfer information over a communication system that is presumed to be insecure, like the telephone lines or a public communications network (such as the Internet). In this electronic computerized context, cryptography provides the necessary tools to digitally secure sensitive and valuable electronic messages in a manner that ensures privacy between legitimate or authenticated senders and recipients of messages, even though the messages are subject to potential interception on the insecure communication system.

Before sending an electronic message, a sender encrypts it. "Encryption" transforms the message from its plain text into some meaningless cipher-text that is not understandable in its raw form, and cannot be deciphered by an eavesdropper. To assure the recipient that the true sender originated the message, and not an impostor, the sender "digitally signs" the message with a unique digital signature. The signed encrypted message is then transmitted over the insecure network to the intended recipient. The recipient receives and decrypts the encrypted message. "Decryption" transforms the message from its cipher-text back to its plain text. Only the recipient is presumed to have the ability to decipher the message. The recipient can also "verify" the message to ensure that it has not been altered since it was sent by the legitimate sender, and to determine the legitimacy of the attached digital signature.

Encryption, decryption, authentication, and verification are principal cryptographic primitives that are used in an electronic network setting to facilitate the security, privacy, authenticity, and integrity of information being exchanged. These cryptographic primitives commonly involve the use of secret cryptographic keys. "Keys" are numerical values that are used in the cryptographic algorithms that encrypt and decrypt messages. Each key is uniquely associated with a particular identity, such as a person, group, physical object, business, or institution. At least some of the keys are kept secret and used selectively by their owners. For example, using available public key cryptographic algorithms a person might use their private signature key to electronically sign a purchase order intended for the merchant. This purchase order can then be encrypted using a symmetric (or secret key) encryption algorithm. This secret encryption key can then be encrypted using the Merchant's public key exchange key, so that it can be transmitted to the Merchant without fear of compromise. To process the purchase order, the Merchant will first recover the secret encryption key using their private key exchange key. They can then use this key to decrypt the message. Finally, the merchant would then use the customer's public signing key to verify the signature on the purchase order.

Public key algorithms are designed to insure that it is not feasible to determine the corresponding private key even with knowledge of the public key and with examples of data encrypted with the public key.

Public and private key pairs can also be used for purposes of user authentication. For this purpose, a challenging entity provides some piece of data to the user. The user (or the user's computer) encrypts the data (or a defined derivative of the data) using the user's private key, and the result is sent back to the challenging entity. The challenging entity decrypts this data using the user's public key and compares the resulting data with the original data (or the defined derivative of the data). If the data matches, the user is considered to be authenticated.

There are potential hazards of using cryptographic functions in the computerized network setting. Since the functions are carried out electronically, the user might not be aware of sophisticated electronic attacks from computer viruses or other hostile code. Careless applications might use cryptographic encryption or signature keys in ways that jeopardize the key's secrecy. Moreover, malicious applications might deliberately compromise the user's secrecy or perform unauthorized cryptographic operations. For instance, a malicious application might read a user's private keys, presumably encrypted using some symmetric key (i.e., secret key) cryptographic algorithm, and transmit them to some adverse party. The adverse party could then work on recovering the user's private keys using whatever resources are at its disposal without concern over alerting the user under attack. A computer implemented cryptographic system should provide the needed security to prevent attack from such poorly devised or malicious applications.

One way to enhance the security of cryptographic operations performed in such an environment is to perform them within an intelligent security token, such as a Smart Card, that is configured especially for an individual user. Smart Cards are being developed for use in this environment. Such a Smart Card typically has a general purpose microprocessor or microcontroller, volatile read/write memory (RAM), read-only memory (ROM), non-volatile read/write memory (i.e., EEPROM, "flash" memory, etc.), tamper-resistant packaging, and specialized hardware for performing public key cryptography.

When used in this environment, a Smart Card is personalized for a specific user. Key to this personalization is internal generation of any public/private key pairs or symmetric (i.e., secret) keys which are associated with the user. These keys are used in electronic transactions to identify and authenticate the Card owner, and to encrypt, decrypt, and verify other data.

The advantage of using a Smart Card to perform critical cryptography operations is that the Smart Card can be programmed or otherwise configured to never expose the user's private keys. Rather than providing a private key to the user's computer, the key is held within the Smart Card, and required cryptographic operations are performed on the Smart Card itself. This makes it impossible for hostile code to obtain the private key.

To provide an even higher degree of security, a Smart Card often requires a password before it will perform security-critical operations. Well-written application software requires the user to manually enter the password when it is requested by the Smart Card. Because of this, the Card cannot be used for fraudulent purposes even if it is stolen.

Even with these precautions, the inventors have realized that there is a potential security problem when using a Smart Card for user authentication purposes in conjunction with a personal computer connected either permanently or sporadically to a public network. The danger is from viruses or other hostile software that seek to utilize the security-related services of a Smart Card without the owner's knowledge or authorization.

One possible threat is from software which may learn the owner's card activating password, and then "sign" fraudulent commerce documents on the purported behalf of the owner. It is difficult or impossible for the Smart Card to ensure that a password has been actually entered by a user rather than being passed directly from an application program that has memorized the password.

Another possible threat is from software which attempts to "piggy-back" a signature operation on an already activated Card. The inventors recognize that requiring password activation of the Card for every security operation may be unacceptable from a user interface perspective. Hence, an activated Card may be able to perform multiple cryptographic operations. This opens up the possibility of hostile code exploiting this capability without knowledge of the user.

The potential consequences of unauthorized use of a Smart card will become more and more significant as greater legal significance is attached to digital authentication and particularly to digital signatures. For this reason, it is important to provide as many safeguards as possible to ensure that the security and authentication-related functions of a Smart Card are utilized only with the explicit authorization of the Smart Card owner.

SUMMARY OF THE INVENTION

The invention enhances the security of authentication and digital signature operations performed by a Smart Card-type device by using a security actuator or key that must be physically operated by a person prior to any security-critical operation being completed by the device. The security key is associated with a Smart Card reader device that acts as a peripheral to a personal computer or programmable user terminal. In response to receiving a request to perform a security-critical operation, the Smart Card is programmed to send a user presence inquiry to the reader device. In response to the user presence inquiry, the reader device disables communications from the personal computer to the Smart Card until the security key is manually operated, whereupon the reader device sends a user presence confirmation to the Smart Card. The Smart Card will not perform security-critical operations until receiving the user presence confirmation.

DETAILED DESCRIPTION OF THE PREFERRED EMBODIMENT

Figure 1:
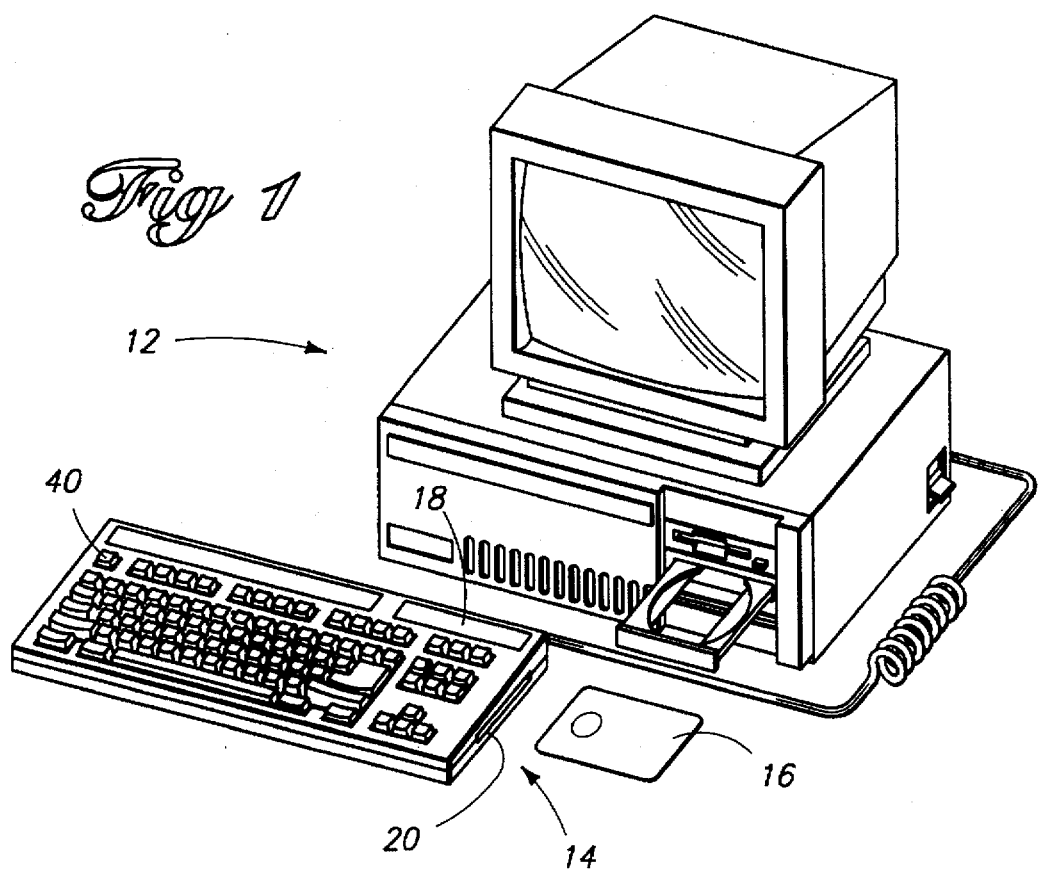
FIGS. 1 and 2 show a user security system in accordance with a preferred embodiment of the invention, implemented in conjunction with a personal computer.
Figure 2:
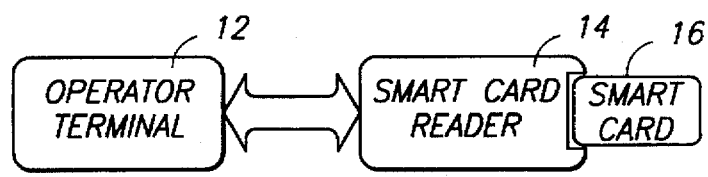

FIGS. 1 and 2 show a user security system in accordance with a preferred embodiment of the invention. The user security system is preferably used in conjunction with an operator terminal. In the embodiment of FIGS. 1 and 2, the operator terminal is a personal computer 12, potentially connected to a local area network (LAN), a wide area network (WAN), and/or a public network or service provider such as the Internet. The personal computer is of a conventional type, having a programmable data processor, electronic and magnetic-based memory, and a graphics display screen.

The user security system itself comprises a reader device 14 in conjunction with an intelligent security token such as a Smart Card 16. Reader device 14 can be implemented in a number of conventional ways, except for the modifications described below. In the preferred embodiment shown, the reader device is a Smart Card reader integrated with an alphanumeric keyboard 18 of computer 12. The keyboard has a slot 20 integrated into its design, along with an associated electrical interface (not shown), that accepts and allows bi-directional communications with the Smart Card using accepted or standard communications protocols.

Figure 3:
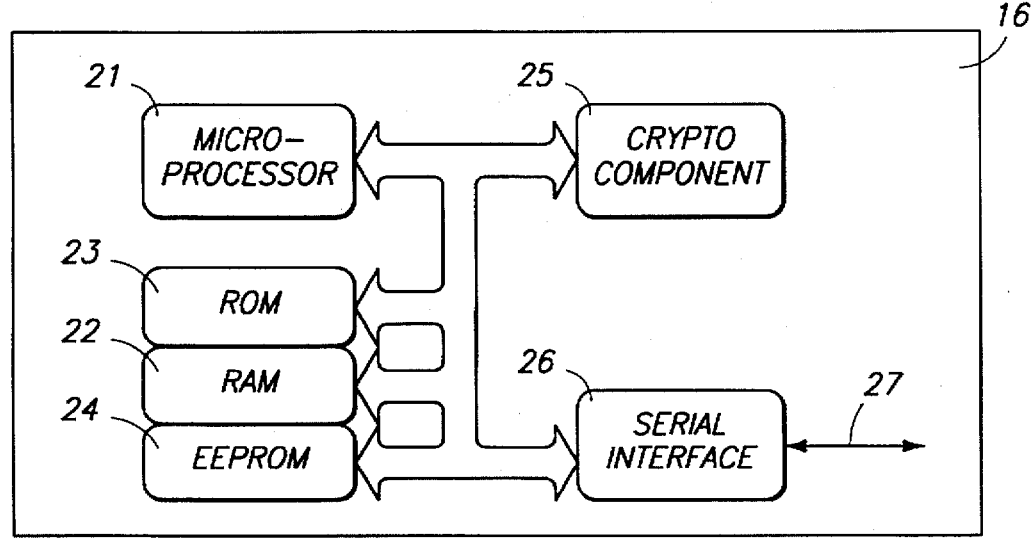
FIG. 3 is a simplified block diagram of a Smart Card in accordance with the invention.

The Smart Card used in the preferred embodiment of the invention is one such as described above and as diagrammed in FIG. 3. It has active intelligence in the form of a programmable microprocessor 21, volatile read/write memory (RAM) 22, read-only memory (ROM) 23, non-volatile read/write memory (i.e., EEPROM, "flash" memory, etc.) 24, tamper-resistant packaging, and a specialized component 25 for performing public key cryptography. Crypto component 25 might be implemented in either hardware or software, although software implementations are currently very slow compared to hardware or hardware-assisted implementations. Smart Card 16 also has a communications interface 26 and at least one communications line 27 for communicating with a reader device. The microprocessor of Smart Card 16 is programmed to implement security-critical operations requiring user authorization, in response to commands received over its communications line(s).

Note that while the term "Smart Card" is usually associated with a particular physical form factor and electrical interface, other configurations could also be used—keeping in mind that whatever design is chosen should be relatively portable and tamper-proof, and include features for performing or otherwise facilitating security-critical operations such as providing digital signatures.

Figure 4:
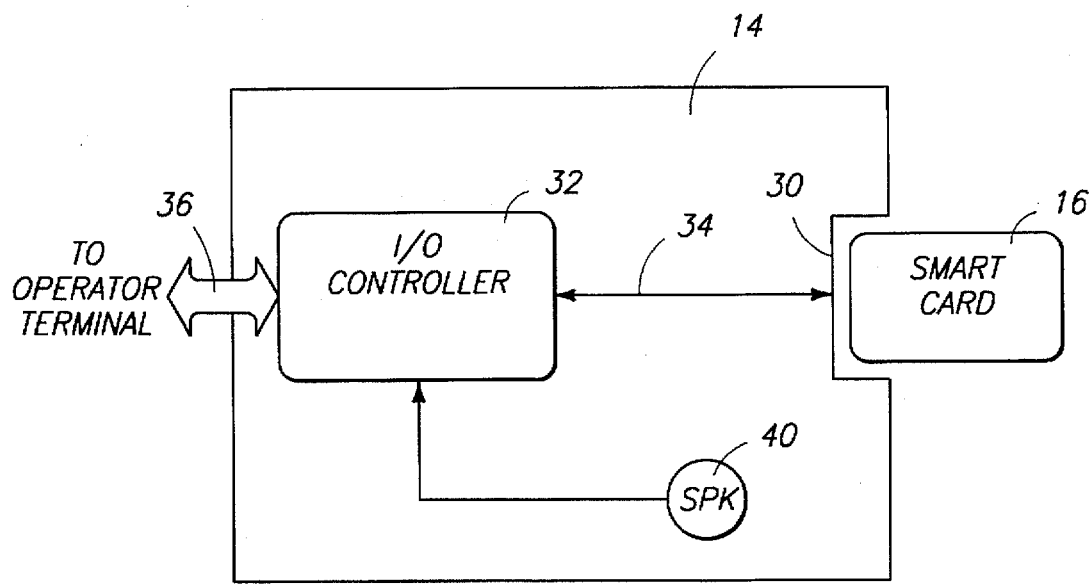
FIGS. 4 and 5 are simplified block diagrams of alternative embodiments of a reader device in accordance with the invention.

Reader device 14 acts primarily as a communications interface, providing bi-directional communications between operator terminal 12 and Smart Card 16. FIG. 4 shows a simplified block diagram of reader device 14. It includes a mechanical and electrical interface 30, which receives Smart Card 16, and an I/O controller 32 that communicates with Smart Card 16. One or more communications lines 34 extend between I/O controller 32 and Smart Card interface 30 to provide bi-directional communications between I/O controller 32 and Smart Card 16. I/O controller 32 also has a bi-directional communications medium or path 36 to operator terminal 12, through which communications between Smart Card 16 and operator terminal 12 are provided. In the preferred embodiment described herein, I/O controller 32 is a microprocessor or microcontroller, along with associated peripheral circuits. Even more preferably, it is the same microprocessor or controller used to control the functions of keyboard 18. Communications medium 36 is preferably the same as that used for communicating keyboard operations to operator terminal 12.

In addition to the features already described, reader device 14 has a security actuator or key 40, also referred to as a Secure Presence Key (SPK), that is physically operable by a person. In the preferred embodiment, the security actuator is an additional or existing key on keyboard 18. In a more conventional reader device, the actuator might be a pushbutton, sensor, or some other type of input device, located on the reader device, that requires physical effort or contact by a human user for its operation. The actuator might conceivably be a device associated with some other device that requires or allows physical operation, such as, for example, a sensor or switch that detects the insertion of a Smart Card into the reader device. In general, actuator 40 might be any device that is activated by a deliberate physical effort on the part of a person.

Security actuator or key 40 is connected so that its operation can be detected by I/O controller 32. It is used to confirm the presence of a person at the operator terminal before Smart Card 16 performs any security-critical operations. Key 40 is connected and I/O controller 32 is programmed in such a way that operator terminal 12 cannot emulate the operation of key 40. Pressing key 40 generates a user presence signal or code within reader device 14 that is sent directly to Smart Card 16, without first being directed to operator terminal 12. In other words, operator terminal 12 is not involved in generating the user presence code—it is generated by logic within reader device 14 and sent directly to Smart Card 14. This is an exception to normal operation, in which communications destined for Smart Card 16 are generated by the operator terminal and merely passed through reader device 14 (with appropriate conversions relating to communications protocols and electrical requirements).

Smart Cart 16 is programmed to take advantage of the added functionality of reader device 14. Specifically, the user security logic implemented by Smart Card 16 is configured to signal reader device 14 by sending a presence inquiry or other predetermined signal over communications line(s) 34 prior to performing any security-critical operations. The Smart Card is further programmed to wait for the user presence signal or other specified counter-signal before performing the security-critical operations.

The I/O controller of reader device 14 is programmed to implement security logic that responds to the presence inquiry signal by requiring a user to press the security key. More specifically, reader device 14 is configured to receive the presence inquiry from Smart Card 16 and in response to detect or wait for operation of security key 40. When using a Smart Card, the preferred implementation of the presence inquiry is a special byte value sent by the Smart Card as part of the command-response protocol between the terminal and the Smart Card. For other security tokens, an alternative would be to take advantage of a unique hardware control signal generated by the security token. Only upon detecting operation of security key 40 does reader device 14 supply the countersignal to Smart Card 16. Only upon receiving the counter-signal does Smart Card 14 perform the security-critical operation. Furthermore, Smart Card 14 is optionally programmed to automatically and temporarily disable itself if the correct counter-signal is not received in response to the presence inquiry within a preset time limit.

The various steps relating to the security key are performed independently of operator terminal 12. Furthermore, these steps are implemented in such a way that application software running on operator terminal 12 does not even need to know of the presence or operation of the security key.

Reader device 14 is specifically configured to prevent operator terminal 12 from supplying the counter-signal to Smart-Card 16 during the period between receiving the presence inquiry and detecting operation of the security key. This period corresponds to the period when Smart Card 16 is waiting for the user presence counter-signal. The counter-signal can only be generated by a person who physically operates the security key. This ensures that hostile or careless software cannot utilize critical Smart Card services without knowledge of a user.

Figure 5:
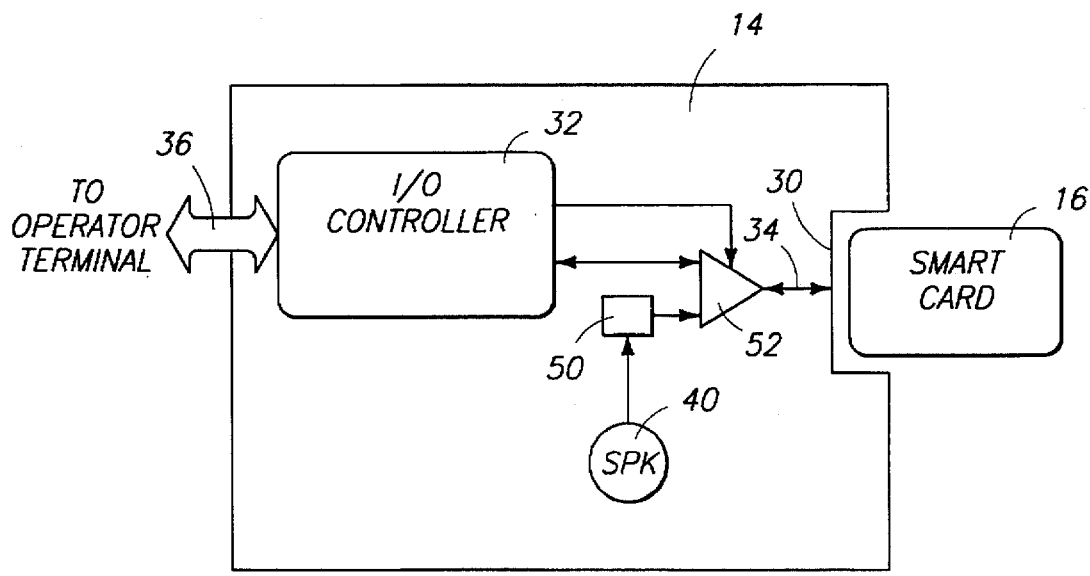

FIG. 5 shows a slightly different conceptual configuration of a reader device. The reader device of FIG. 5 is similar that of FIG. 4, and like components have therefore been identically labeled. In this case, security key 40 is not connected to be monitored directly by I/O controller 32. Rather, the configuration includes a code generation circuit 50 and a multiplex circuit 52. Security key 40 is connected to code generation circuit 50 which is in turn connected to communications line(s) 34 through multiplex circuit 52. In response to receiving the presence inquiry signal, I/O controller 32 switches the state of multiplex circuit 52 so that code generation circuit 50 is in direct communications with Smart Card 16. This also blocks communications from operator terminal 12 to Smart Card 16 and thus prevents operator terminal 12 from supplying the required counter-signal. Rather, code generation circuit 50 is configured to supply the counter-signal upon operation of the security key. Once Smart Card 16 has received the counter-signal, I/O controller 32 switches multiplex circuit 52 so that operator terminal 12 can again communicate with Smart Card 16.

Table 1, below, illustrates the methodical steps performs by the operator terminal, the reader device, and the Smart Card in accordance with the preferred embodiment of the invention.

TABLE 1

| Step | Operator Terminal | Reader Device | Smart Card |
|---|---|---|---|
| 1 | Issue request | | |
| 2 | | Pass request to Smart Card | |
| 3 | | | Accept request |
| 4 | | | Send first byte of a two-byte response sequence and wait for user presence signal |
| 5 | | Receive first byte of response and:<br>• pass it to opertor terminal<br>• disable further communications from the operator terminal | |
| 6 | Receive first byte of response; wait for 2$^{nd}$ byte before proceeding | | |
| 7 | | Send user presence signal to Smart Card when SPK pressed | |
| 8 | | | Receive and process user presence signal |
| 9 | | | Send second byte of the two-byte response |
| 10 | | Receive second byte of response and:<br>• pass it to operator terminal<br>• enable normal communications | |
| 11 | Receive second byte of response | | |

To begin with, the operator terminal sends a request for a security-critical operation such as user authentication or digital signature generation to the Smart Card through the reader device. This step is illustrated in Table 1 by steps 1 and 2. The request is any command or code that, if accepted, would require the Smart Card to perform an operation that, if unauthorized, might subject the owner of the Smart Card to legal or financial liability.

In step 3, the Smart Card accepts and begins processing the request. In step 4, the Smart Card responds to the request by sending the first byte of a two-byte response code back to the operator terminal, through the reader device. This byte acts as the user presence inquiry discussed above.

In step 5, the reader device receives and processes the first byte of the two-byte response code and passes it on to the operator terminal. The reader device responds, in addition, by disabling or blocking further communications from the operator terminal to the Smart Card. The reader device then enters a wait state until a user presses the security key.

Step 6 of Table 1 indicates the reception of the first byte of the two-byte response code by the operator terminal.

In step 7, the reader device detects operation of the security key and responds by sending the user presence signal or confirmation to the Smart Card. The user presence signal is sent only in response to operation of the security key. The Smart Card receives the user presence signal in step 8 and in response sends the second byte of the two-byte response code to the operator terminal through the reader device (step 9). The Smart Card then goes on to perform the authentication operation that was the subject of the authentication request.

As indicated by step 10, the reader device receives the second byte of the two-byte response code and passes it on to the operator terminal. In addition, the reader device unblocks and restores normal communications from the operator terminal to the Smart Card. Step 11 indicates the reception of the second byte of the two-byte response code by the operator terminal, which completes the response to the original request.

Note that the user presence verification steps are performed independently of and without any participation by the operator terminal. The operator sends a request and then waits for both bytes of the two-byte response code. Once both bytes have been received, the operator terminal can continue to communicate with the Smart Card. The scheme effectively prevents the operator terminal from supplying the user presence confirmation to the Smart Card. As an optional step, not shown, the Smart Card can be programmed to disable itself if it does not receive the user presence confirmation request from the reader device in response to the presence inquiry.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A user security system for use in conjunction with an operator terminal, the user security system comprising:

an intelligent security token that is used for performing security-critical operations requiring user authorization;

a reader device providing communications between the intelligent security token and the operator terminal;

the reader device having a security actuator that requires physical operation by a person, the reader device being configured to detect such physical operation of the security actuator after a request by the operator terminal for the intelligent security token to perform a security-critical operation, wherein the security actuator does not require user identity verification;

the intelligent security token being configured to perform the security-critical operation only after the reader device detects physical operation of the security actuator.

2. A user security system as recited in claim 1, wherein the reader device is configured to detect physical operation of the security actuator independently of the operator terminal.

3. A user security system as recited in claim 1, wherein the security actuator is a single operator.

4. A user security system for use in conjunction with an operator terminal, the user security system comprising:

an intelligent security token that is used for performing security-critical operations requiring user authorization;

a reader device providing communications between the intelligent security token and the operator terminal;

the intelligent security token being configured to signal the reader device prior to performing a security-critical operation and to wait for a counter-signal before performing said security-critical operation;

the reader device having a security actuator that requires physical operation by a person, the reader device being configured to supply the counter-signal to the intelligent security token only in response to operation of the security actuator, wherein the security actuator does not require user identity verification.

5. A user security system as recited in claim 4, wherein the reader device is configured to supply the counter-signal to the intelligent security token independently of the operator terminal.

6. A user security system as recited in claim 4 wherein the reader device prevents the operator terminal from supplying the counter-signal to the intelligent security token at least during the period when the intelligent security token is waiting for the counter-signal.

7. A user security system as recited in claim 4, wherein:
the reader device is configured to supply the counter-signal to the intelligent security token independently of the operator terminal; and
the reader device prevents the operator terminal from supplying the counter-signal to the intelligent security token at least during the period when the intelligent security token is waiting for the counter-signal.

8. A user security system as recited in claim 4 wherein the reader device at least partially blocks communications from the operator terminal to the intelligent security token upon being signaled by the intelligent security token.

9. A user security system as recited in claim 4 wherein the reader device at least partially blocks communications from the operator terminal to the intelligent security token upon being signaled by the intelligent security token and unblocks communications from the operator terminal to the intelligent security token after the security actuator is operated.

10. A user security system as recited in claim 4, wherein the security actuator is a single operator.

11. A user security system comprising:
an operator terminal;
an intelligent security token that is used for performing security-critical operations requiring user authorization;
a reader device providing communications between the intelligent security token and the operator terminal;
the intelligent security token being configured to wait for a presence-indicating signal before performing said security-critical operation;
the reader device having a security actuator that requires physical operation by a person, the reader device being configured to supply the presence-indicating signal to the intelligent security token only in response to physical operation of the security actuator, wherein the security actuator does not require user identity verification.

12. A user security system as recited in claim 11, wherein the reader device is configured to supply the presence-indicating signal to the intelligent security token independently of the operator terminal.

13. A user security system as recited in claim 11, wherein the reader device prevents the operator terminal from supplying the presence-indicating signal to the intelligent security token at least during the period when the intelligent security token is waiting for the presence-indicating signal.

14. A user security system as recited in claim 11, wherein:
the reader device is configured to supply the presence-indicating signal to the intelligent security token independently of the operator terminal; and
the reader device prevents the operator terminal from supplying the presence-indicating signal to the intelligent security token at least during the period when the intelligent security token is waiting for the presence-indicating signal.

15. A user security system as recited in claim 11, wherein the security actuator is a single operator.

16. A reader device for use in conjunction with an operator terminal and with an intelligent security token that performs security-critical operations requiring user authorization, the reader device comprising:
a communications interface between the operator terminal and the intelligent security token;
a security actuator that requires physical operation by a person, wherein the security actuator does not require user identity verification;
security logic configured to detect operation of the security actuator in response to a request for the intelligent security token to perform a security-critical operation;
the security logic being further configured to supply a signal to the intelligent security token upon detecting said operation of the security actuator.

17. A reader device as recited in claim 16, wherein the security logic is configured to detect operation of the security actuator independently of the operator terminal.

18. A reader device as recited in claim 16, the security logic being further configured to prevent the operator terminal from supplying the signal to the intelligent security token at least during the period between the request for the intelligent security token to perform the security-critical operation and detecting the operation of the security actuator.

19. A reader device as recited in claim 16, the security logic being further configured to detect operation of the security actuator independently of the operator terminal and to prevent the operator terminal from supplying the signal to the intelligent security token at least during the period between the request for the intelligent security token to perform the security-critical operation and detecting the operation of the security actuator.

20. A reader device as recited in claim 16, the security logic being further configured to at least partially block communications from the operator terminal to the intelligent security token in response to the request for the intelligent security token to perform the security-critical operation.

21. A reader device as recited in claim 16, the security logic being further configured to at least partially block communications from the operator terminal to the intelligent security token in response to the request for the intelligent security token to perform the security-critical operation and to unblock communications from the operator terminal to the intelligent security token upon detecting the operation of the security actuator.

22. A reader device as recited in claim 16 and further comprising a computer alphanumeric keyboard and an associated keyboard controller, the keyboard controller communicating with the intelligent security token and being programmed to implement the security logic.

23. A reader device as recited in claim 16 and further comprising a computer alphanumeric keyboard and an associated keyboard controller, the keyboard controller communicating with the intelligent security token and being programmed to implement the security logic, the security actuator being positioned on the alphanumeric keyboard.

24. A reader device as recited in claim 16 and further comprising a computer alphanumeric keyboard and an associated keyboard controller, the keyboard controller communicating with the intelligent security token and being programmed to implement the security logic, the keyboard controller communicating keyboard operations to the operator terminal through a keyboard communications media and providing communications between the operator terminal and the intelligent security token through the same keyboard communications media.

25. A reader device as recited in claim 16, wherein the security actuator is a single operator.

26. A reader device for use in conjunction with an operator terminal and with an intelligent security token that performs security-critical operations requiring user authorization, the reader device comprising:

a communications interface between the operator terminal and the intelligent security token;

a security actuator that is physically operable by a person;

security logic configured to receive a predetermined signal from the intelligent security token and in response to detect operation of the security actuator;

the security logic being further configured to at least partially block communications from the operator terminal to the intelligent security token upon receiving the predetermined signal from the intelligent security token, and to unblock communications from the operator terminal to the intelligent security token upon detecting said operation of the security actuator.

27. A reader device as recited in claim 26, wherein the security logic is configured to detect operation of the security actuator independently of the operator terminal.

28. A reader device as recited in claim 26, the security logic being further configured to supply a counter-signal to the intelligent security token upon detecting said operation of the security actuator.

29. A reader device as recited in claim 26, wherein the security actuator is a single operator.

30. An intelligent security token for use in conjunction with a reader device, the security token comprising:

at least one communications line for communicating with the reader device;

user security logic that performs security-critical operations requiring user authorization in response to commands received over said at least one communications line;

the user security logic being further configured to perform said security-critical operation only after receiving a user presence confirmation from the reader device, wherein the user security logic does not require user identity verification.

31. An intelligent security token as recited in claim 30 wherein the user security logic is configured to send a presence inquiry to the reader device prior to performing a security-critical operation.

32. An intelligent security token as recited in claim 31 wherein the user security logic disables the intelligent security token if it does not receive the user presence confirmation from the reader device in response to the presence inquiry.

33. A method of using an intelligent security token to authenticate a user, comprising the following steps:

sending a request for a security-critical operation requiring user authorization from an operator terminal to the intelligent security token through a reader device;

in response to sending the request to the intelligent security token, the reader device detecting physical operation of a security actuator by a person, said detecting step being performed independently of the operator terminal, wherein physical operation of the security actuator does not require user identity verification;

the intelligent security token performing the security-critical operation only after the reader device detects physical operation of the security actuator.

34. A method as recited in claim 33, the reader device supplying a user presence confirmation to the intelligent security token upon detecting physical operation of the security actuator.

35. A method as recited in claim 33, wherein physical operation of the security actuator requires operation of a single operator.

36. A method of using an intelligent security token to authenticate a user, comprising the following steps:

sending a request for a security-critical operation requiring user authorization from an operator terminal to the intelligent security token through a reader device;

the intelligent security token sending a presence inquiry to the reader device in response to receiving the request;

in response to receiving the presence inquiry, the reader device detecting physical operation of a security actuator by a person, wherein physical operation of the security actuator does not require user identity verification;

upon detecting operation of the security actuator, the reader device supplying a user presence confirmation to the intelligent security token;

the intelligent security token performing the security-critical operation only after receiving the user presence confirmation from the reader device.

37. A method as recited in claim 36 wherein the step of detecting operation of the security actuator is performed independently of the operator terminal.

38. A method as recited in claim 36 and further comprising a step performed by the reader device of preventing the operator terminal from supplying the user presence confirmation to the intelligent security token.

39. A method as recited in claim 36 and further comprising a step performed by the reader device of at least partially blocking communications from the operator terminal to the intelligent security token upon receiving the presence inquiry from the intelligent security token.

40. A method as recited in claim 36 and further comprising steps performed by the reader device of at least partially blocking communications from the operator terminal to the intelligent security token upon receiving the presence inquiry from the intelligent security token and of unblocking communications from the operator terminal to the intelligent security token upon subsequently detecting operation of the security actuator.

41. A method as recited in claim 36 and further comprising a step of disabling the intelligent security token if it does not receive the user presence confirmation from the reader device in response to the presence inquiry.

42. A method as recited in claim 36, wherein physical operation of the security actuator requires operation of a single operator.

43. A method of operating a reader device in conjunction with an intelligent security token to authenticate a user, comprising the following steps:

receiving communications from an operator terminal;

sending said communications to the intelligent security token;

receiving a presence inquiry from the intelligent security token;

in response to receiving the presence inquiry, detecting physical operation of a security actuator by a person without requiring identification verification;

upon detecting operation of the security actuator, supplying a user presence confirmation to the intelligent security token.

44. A method as recited in claim 43 and further comprising a step of preventing the operator terminal from supplying the user presence confirmation at least during the period between receiving the presence inquiry and detecting operation of the security actuator.

45. A method as recited in claim 43, wherein physical operation of the security actuator requires operation of a single operator.

* * * * *